Nov. 23, 1965  T. BAEHNI  3,218,794
CLOCKWORK FERRULE
Filed Nov. 6, 1963

INVENTOR
THOMAS BAEHNI
BY: McGlew and Toren,
attorneys 3,218,794
CLOCKWORK FERRULE
Thomas Baehni, Bienne, Switzerland, assignor to Virola
S.A., Diesbach, Canton of Bern, Switzerland
Filed Nov. 6, 1963, Ser. No. 321,964
Claims priority, application Switzerland, Nov. 17, 1962,
13,487/62
3 Claims. (Cl. 58—115)

The hair-spring of a clockwork is removably secured to the balance staff through the agency of a ferrule which latter includes means for fitting the end of the hair-spring and, by reason of the elasticity bestowed to the ferrule by its shape, said ferrule is adapted to be shifted over the balance shaft, so as to allow various adjustments.

The ferrule of a conventional structure is provided with a radial slot which bestows it with the desired elasticity and with a transverse bore inside which the end of the hair-spring is fitted through the agency of a conical pin.

In certain clockworks, this bore is replaced by a substantially spiral-shaped groove inside which the end of the hair-spring is held fast by clamping or else by gluing. In the case of a gluing, the application of the glue leads to certain difficulties, its fluidity does not allow it to always fill the entire space which is provided for it. On the other hand, certain producers have attempted to correct the lack of balance ascribable to the slot by suitably shaping the ferrule, but the positioning of the correcting means with reference to the slot, has not allowed reaching the desired results.

My invention has for its object a ferrule for the securing of a hair spring on a balance staff of a clockwork, said ferrule being provided with a radial slot ensuring the elasticity of the ferrule on its shaft and with a housing inside which the hair-spring is to be glued. According to my invention, said housing opens into the upper end of the ferrule in a direction perpendicular to the slot in a manner such as will ensure a proper balance of said ferrule while the upper edges of said housing flare outwardly in order to allow an easy introduction of the glue.

I have illustrated, in the accompanying drawings, a preferred embodiment of my invention given by way of a mere example. In said drawings.

Figure 1:
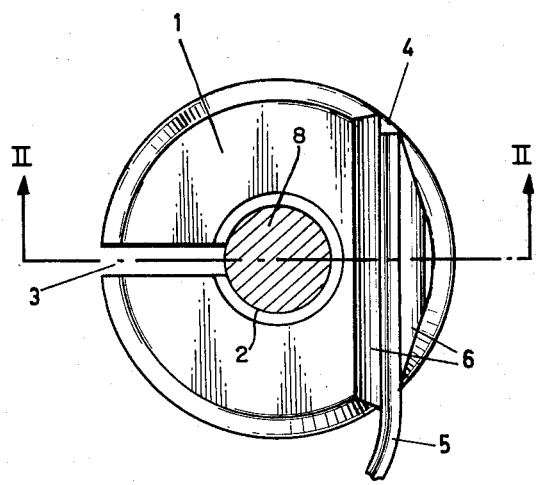
FIG. 1 is a plan view of the ferrule.
Figure 2:
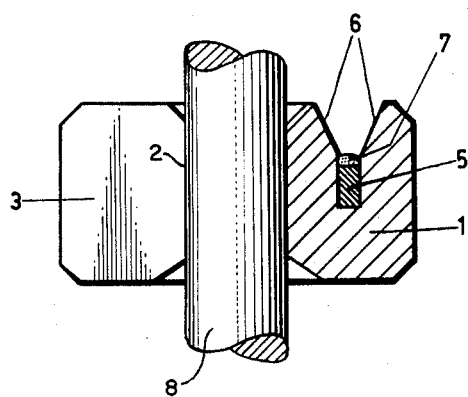
FIG. 2 is a cross-section through line II—II of FIG. 1.

The ferrule illustrated is constituted by a ring 1 inside which a bore 2 is provided for its fitting over the balance staff 8. A radial slot 3 allows said ferrule to be deformed and to clamp elastically the balance staff 8. A transverse housing 4 is milled in a plane perpendicular to the slot providing elasticity. The rectangular cross-section of said transverse housing 4 in a plane perpendicular to the axis of the staff is very slightly larger than that of the blade forming the hair-spring 5 so that the latter may be inserted in said housing without any stressing thereof. The upper edges of said housing 4 are bevelled as shown at 6 in FIG. 2. The size of said bevel is such that the reduction of the momentum of inertia provided by it with reference to the axis of the balance staff is equal to the reduction produced by the slot 3 bestowing elasticity, but its direction is opposed to said latter reduction. Thus, equilibrium is restored and the center of gravity of the ferrule is located on the actual staff axis. The bevel provided on the housing provided for the hair-spring allows a mass of glue 7 adapted to rigidly secure the spring to the ferrule to flow readily into said housing. Said glue is, as a matter of fact, introduced by means of a dropper or of a needle or else of a capillary tube and it is essential to further its flow.

My invention is obviously not limited to the example described and it covers, of course, the ferrules of all sizes to which left-handed or right-handed hair-springs are adapted to be glued.

The balanced ferrule according to my invention allows an easy positioning of the hair-spring and a free flow of glue into the space provided for it. Furthermore, the balance of the ferrule cuts out any lack of isochronism in the oscillatory mass and also the necessity of difficult adjustments to be operated by skilled workmen.

What I claim is:

1. In a clockwork, the combination of a hair-spring, a balance staff and a ferrule fitted over said staff with the axis of said ferrule coinciding with the axis of said balance staff and provide, on one side of its axis, with a radial slot bestowing elasticity to the ferrule and, on the other side of said axis, with a housing extending in a plane perpendicular to the slot, opening into the upper edge of the ferrule for engagement by the inner end of the hair-spring and adapted to ensure an accurate balance of the ferrule with reference to its axis, the upper edges of said housing flaring outwardly to allow an easy insertion of glue into said housing, over the end of the hair-spring.

2. In a clockwork, the combination of a hair-spring, a balance staff and a ferrule fitted over said staff with the axis of said ferrule coinciding with the axis of said balance staff and provided on one side of its axis, with a radial slot bestowing elasticity to the ferrule and, on the other side of said axis, with a housing extending in a plane perpendicular to the slot, opening into the upper edge of the ferrule for engagement by the inner end of the hair-spring and adapted to ensure an accurate balance of the ferrule with reference to its axis, said housing having a rectangular cross-section over the major part of its extent longitudinally of the ferrule and the upper edges of said housing flaring outwardly to allow an easy insertion of glue into said housing.

3. In a clockwork, the combination of a hair-spring, a balance staff and a ferrule fitted over said staff with the axis of said ferrule coinciding with the axis of said balance staff and provided, on one side of its axis, with a radial slot bestowing elasticity to the ferrule and, on the other side of said axis, with a housing extending in a plane perpendicular to the slot, opening into the upper edge of the ferrule for engagement by the inner end of the hair-spring and adapted to ensure an accurate balance of the ferrule with reference to its axis, the upper edges of said housing flaring outwardly to allow an easy insertion of glue into said housing to form a V-shaped input above the remainder of the housing.

References Cited by the Examiner
UNITED STATES PATENTS

| | | | |
|---|---|---|---|
| 438,672 | 10/1890 | Banta | 58—115 |
| 507,549 | 10/1893 | Logan | 58—115 |
| 2,391,816 | 12/1945 | Bennett | 58—115 |

LEO SMILOW, *Primary Examiner.*